United States Patent [19]

Ippen et al.

[11] Patent Number: 4,534,393
[45] Date of Patent: Aug. 13, 1985

[54] PNEUMATIC TIRE

[75] Inventors: Jakob Ippen, Leverkusen; Friedel Stüttgen, Pulheim, both of Fed. Rep. of Germany

[73] Assignee: Bayer Aktiengesellschaft, Fed. Rep. of Germany

[21] Appl. No.: 617,963

[22] Filed: Jun. 7, 1984

Related U.S. Application Data

[63] Continuation of Ser. No. 404,436, Aug. 2, 1982, abandoned.

[30] Foreign Application Priority Data

Aug. 8, 1981 [DE] Fed. Rep. of Germany ....... 3131515

[51] Int. Cl.³ .................... B60C 13/00; B60C 15/06
[52] U.S. Cl. .................................. 152/524; 156/134; 152/542; 152/555
[58] Field of Search ........... 152/353 R, 353 C, 353 G, 152/354 R, 354 RB, 355, 357, 330 RF, 330 R, 352 R, 352 A, 362 CS, 362 R; 156/134

[56] References Cited

U.S. PATENT DOCUMENTS

| 1,165,631 | 12/1915 | Seward | 152/354 |
| 1,818,944 | 8/1931 | Darrow | 152/354 |
| 2,430,560 | 11/1947 | Elliott | 152/354 |
| 2,676,637 | 4/1954 | Frazier | 152/354 |
| 3,074,456 | 1/1963 | Neuville et al. | 152/354 |
| 3,386,486 | 6/1968 | Kovac et al. | 152/354 |
| 3,736,972 | 6/1973 | Petraschek et al. | 152/354 |
| 4,227,563 | 10/1980 | Grosch et al. | 152/354 |
| 4,263,955 | 4/1981 | Ikeda | 152/354 |
| 4,362,200 | 12/1982 | Standley | 152/153 |

FOREIGN PATENT DOCUMENTS 71857 2/1983 Fed. Rep. of Germany ...... 152/355

Primary Examiner—Lois E. Boland
Attorney, Agent, or Firm—Connolly and Hutz

[57] ABSTRACT

The side wall (5) of a pneumatic tire comprises an at least double encirculating multi-layer winding (9, 12) which is joined in an interlacing manner with the laterally adjacent winding (9, 12) by means of staggered layers (10, 11, 13, 14).

3 Claims, 2 Drawing Figures

U.S. Patent     Aug. 13, 1985     4,534,393
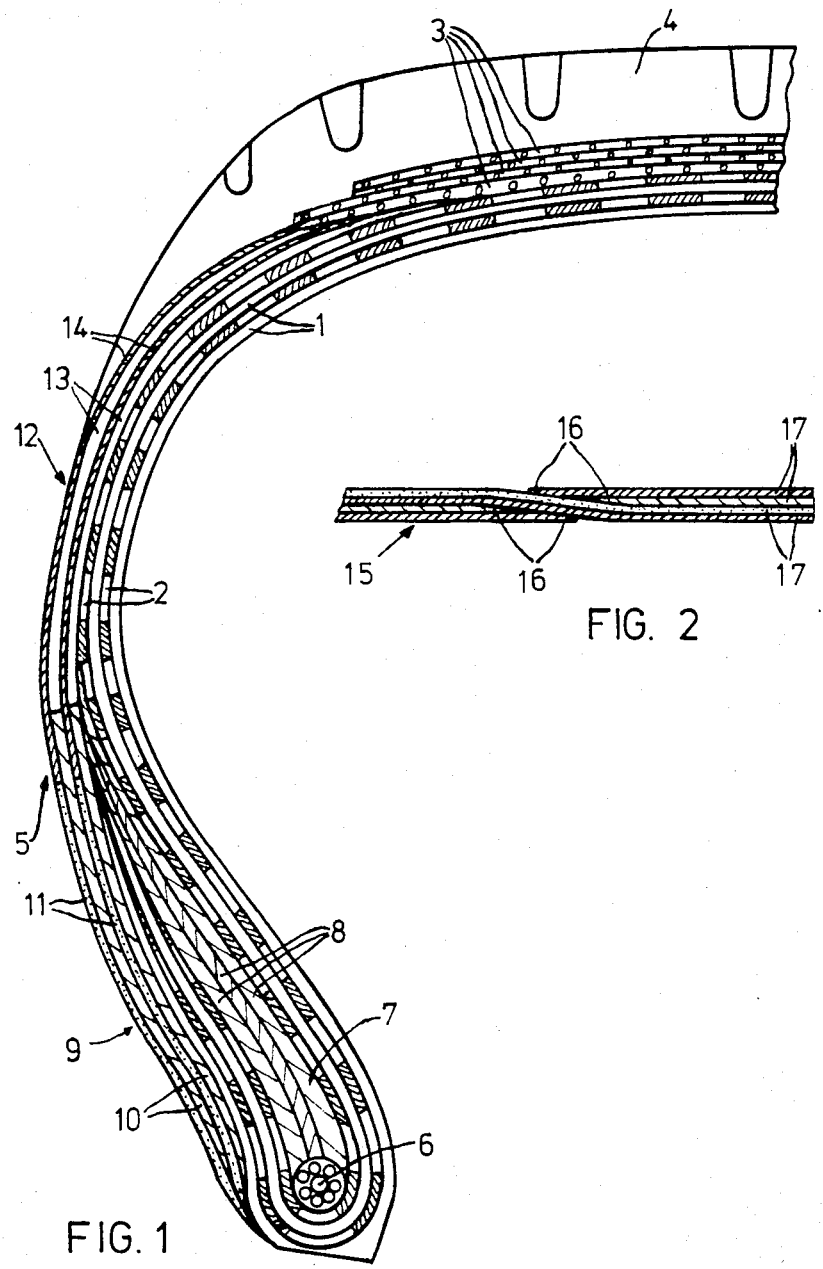

PNEUMATIC TIRE

CROSS-REFERENCE TO RELATED APPLICATION

This application is a continuation of application Ser. No. 404,436 filed Aug. 2, 1982 now abandoned.

This invention relates to a pneumatic tire comprising two or more encirculating wrappings consisting of at least two laminated rubber and/or reinforcing layers.

A pneumatic tire is known in which wrappings of laminated carcass or belt layers are used.

The disadvantage of these wrappings is that lateral (axial) joins are impossible on account of the greater thickness, while the weakening of the cross section becomes excessive. Thus, these widenings could only be used in connection with the expensive conventional construction for the side walls.

The present invention is based on the object of providing a pneumatic tire, in which the joins (for example, the side part, the hump strip and the wire cap) may be installed mechanically while simultaneously increasing the safety.

This object is achieved according to the present invention in that two adjacent wrappings are laterally interlaced.

The advantage of this construction is that the transition from one constructional component to another does not take place at one point, so that the tire endures a high dynamic strain. The interlacing has a particularly favorable effect when mixtures of a different modulus are present.

In a particular embodiment, the windings for interlacing comprise individual layers from 0.3 to 1 mm thick which are in a lateral arrangement staggered by from 10 to 30 mm.

Due to the structure with staggered layers, it is possible to automate the wrapping procedure. During this procedure, no particular requirements have to be made on prefabrication, in contrast to the known joins of the side edges, so that the production according to the present invention is most economic.

In another embodiment, the wrappings are the side part and the hump strip.

As a result of using windings in the side wall, the construction components may also be applied in a fully automatic manner.

An example of the present invention is illustrated in the drawings.

FIG. 1 illustrates a section through a pneumatic tire, according to the present invention, and FIG. 2 illustrates a longitudinal section through a wrapping layer, according to the present invention.

FIG. 1 illustrates a pneumatic tire. A carcass 2 is applied to an air-tight inner plate 1 and is provided with an internal and external wound belt 3 in the tread region, which belt 3 in turn supports the tread 4. A wound wire cap 7 comprising layers which are conically tapered in cross-section is positioned in the side wall 5 joining the wire core 6 in the tire foot or bead. In the lower region, the side wall 5 has as the hump strip a double wrapping 9 comprising pre-doubled, staggered layers 10 and 11 and, in the upper region, has as the side wall part a double wrapping 12 comprising pre-doubled staggered layers 13 and 14, both wrappings 9 and 12 being wound together in an interlaced manner in the boundary region.

FIG. 2 illustrates a longitudinal section through a wrapping 15, in which the ends of the pre-doubled layers 17 overlap.

We claim:

1. In a pneumatic tire having a continuous carcass folded around cores in the beads of the tire and extending into the side walls of the tire, two at least double encircling layers on the exterior of the carcass in each side wall of the tire, and each at least double encircling layer consisting of at least two laminated rubber and/or reinforcing plies, the improvement according to which each rubber and/or reinforcing ply of one at least double encircling layer abuts in the tire side walls one of the plies of the other at least double encircling layer, and each abutment being staggered with respect to an adjacent abutment whereby the plies of the two at least double encircling layers are laterally interlaced with one another in the side walls of the tire.

2. A pneumatic tire as in claim 1 wherein the individual plies are from 0.3 to 1 mm thick and the ply abutments are laterally staggered by from 10 to 30 mm for interlacing.

3. A pneumatic tire as in claim 1 wherein the plies of each at least double encircling layer form a hump strip and an upper side part in the side walls of the tire.

* * * * *